(12) United States Patent
Chao et al.

(10) Patent No.: US 11,431,181 B2
(45) Date of Patent: Aug. 30, 2022

(54) WIRELESS SOUND OUTPUT DEVICE WITH CHARGING FUNCTION

(71) Applicant: PRIMAX ELECTRONICS LTD., Taipei (TW)

(72) Inventors: Pao-Chung Chao, Taipei (TW); Pei-Ming Chang, Taipei (TW); Shih-Chieh Hsu, Taipei (TW); Wei-Lung Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 247 days.

(21) Appl. No.: 16/912,170

(22) Filed: Jun. 25, 2020

(65) Prior Publication Data

US 2021/0351601 A1 Nov. 11, 2021

(30) Foreign Application Priority Data

May 8, 2020 (TW) .................................. 109115439

(51) Int. Cl.
*H02J 7/00* (2006.01)
*H04R 1/10* (2006.01)
*H02J 7/02* (2016.01)

(52) U.S. Cl.
CPC .............. *H02J 7/0044* (2013.01); *H02J 7/02* (2013.01); *H04R 1/1016* (2013.01); *H04R 1/1025* (2013.01); *H04R 2420/07* (2013.01); *H04R 2499/11* (2013.01)

(58) Field of Classification Search
CPC . H02J 7/0044; H02J 7/02; H02J 7/342; H04R 1/1016; H04R 1/1025; H04R 2420/07; H04R 2499/11
See application file for complete search history.

(56) References Cited

U.S. PATENT DOCUMENTS

| | | | |
|---|---|---|---|
| 10,129,626 B1* | 11/2018 | Jung ........................ | H02J 7/342 |
| 2017/0289668 A1* | 10/2017 | Kim ................... | H04M 1/72412 |
| 2019/0075385 A1* | 3/2019 | Lee ........................ | H02J 7/0045 |
| 2021/0409856 A1* | 12/2021 | Zhu ........................ | H04W 4/80 |

FOREIGN PATENT DOCUMENTS

CN 110691294 A * 1/2020

* cited by examiner

*Primary Examiner* — Angelica M McKinney
(74) *Attorney, Agent, or Firm* — WPAT, PC

(57) ABSTRACT

A wireless sound output device includes a wireless earbud and a charging base. The wireless earbud is placed in the charging base. If a true wireless stereo Bluetooth controller of the wireless earbud detects that a mode switching circuit of the charging base is switched to a wireless Bluetooth receiver mode, an analog signal is transmitted to an audio source output hole of the charging base through an audio source analog signal output switching unit of the wireless earbud.

7 Claims, 4 Drawing Sheets

WIRELESS SOUND OUTPUT DEVICE WITH CHARGING FUNCTION

FIELD OF THE INVENTION

The present invention relates to a wireless sound output device, and more particularly to a wireless sound output device with a charging function.

BACKGROUND OF THE INVENTION

With the popularization of portable electronic devices and the development of communication technology, people can browse the media resources stored in the device anytime and anywhere by using the portable electronic device, or play online audio and video data through the network connection. In order to avoid disturbing others or blocking the noise of the external environment, earbuds have become an indispensable accessory for portable electronic devices. Moreover, for making the earbuds more convenient to use and solving the problems of the wired earphones (e.g., easily entangled and damaged), many manufacturers have also begun to develop wireless earbuds with many functions. The wireless earbuds not only improve the user's operation flexibility but also allow the user to achieve a better experience when using the earbuds on different occasions.

However, the wireless earbuds still have some drawbacks. For example, since the wireless earbud is not equipped with the earbud cable, an independent power supply has to be provided in the wireless earbud to provide power for the earbud during operation. For maintaining the convenience and comfort of the wireless earbud, the wireless earbud can only use a power storage unit with less power storage amount. Since the electric quantity of the wireless earbud is insufficient after the wireless earbud has been used for a time period, the wireless earbud has to be charged frequently. In accordance with the conventional charging technology, a charging box or a charging dock is usually used to charge the wireless earbud. For charging the wireless earbud, the user has to take down the earbud and place the earbud in the charging box or the charging dock. After the charging process is completed, the earbud can be worn by the user. Since the charging process of the wireless earbud is frequently performed, the media playback experience is frequently interrupted.

SUMMARY OF THE INVENTION

The present invention provides a wireless sound output device with a charging function. The wireless sound output device is capable of outputting sound, music or any other appropriate media source.

In accordance with an aspect of the present invention, a wireless sound output device with a charging function is provided. The wireless sound output device includes a wireless earbud and a charging base. The wireless earbud includes a first power storage unit, a speaker unit, an audio source analog signal output switching unit, a true wireless stereo Bluetooth controller and a first connection port. The electric power for operating the wireless earbud is provided by the first power storage unit. The true wireless stereo Bluetooth controller receives a Bluetooth digital signal from a portable electronic device, converts the Bluetooth digital signal into an analog signal, and transmits the analog signal to the speaker unit through the audio source analog signal output switching unit. The wireless earbud is accommodated within the charging base. The charging base includes a mode switching circuit, a second connection port, a second power storage unit and an audio source output hole. When the second connection port is connected with the first connection port, the charging base is electrically connected with the wireless earbud. The audio source output hole is connected with a wired speaker. When the true wireless stereo Bluetooth controller detects that the mode switching circuit is switched to a wireless Bluetooth receiver mode, the first power storage unit is charged by the second power storage unit and the analog signal is transmitted from the audio source analog signal output switching unit to the audio source output hole.

Moreover, when the true wireless stereo Bluetooth controller detects that the mode switching circuit is switched to a charging mode, the second power storage unit charges the first power storage unit and the true wireless stereo Bluetooth controller stops receiving the Bluetooth digital signal.

In an embodiment, the charging base further includes a switching element. The mode switching circuit is switched to the wireless Bluetooth receiver mode or the charging mode through an operation of the switching element.

In an embodiment, the charging base further includes a charging port, and the charging port is connected with an external power source. The electric power from the external power source is transmitted to the second power storage unit through the charging port so as to charge the second power storage unit.

In an embodiment, the wired speaker is a wired earbud or a wired stereo device.

In an embodiment, the portable electronic device is a notebook computer, a tablet computer, a personal digital assistant, a smart phone or a game console.

In an embodiment, the charging base includes an accommodation structure, and the wireless earbud is accommodated within the accommodation structure.

In an embodiment, the second connection port is installed in the accommodation structure.

From the above descriptions, the present invention provides the wireless sound output device. The wireless sound output device of the present invention can receive the Bluetooth digital signal while the wireless earbud is charged by the charging base. After the received Bluetooth digital signal is converted into the analog signal, the analog signal is transmitted to the charging base and outputted from a wired earbud or a wired stereo device that is connected with the charging base. Consequently, the sound or the music can be played continuously. In such way, the process of playing the sound or the music is not paused during the frequent charging process of the wireless earbud.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
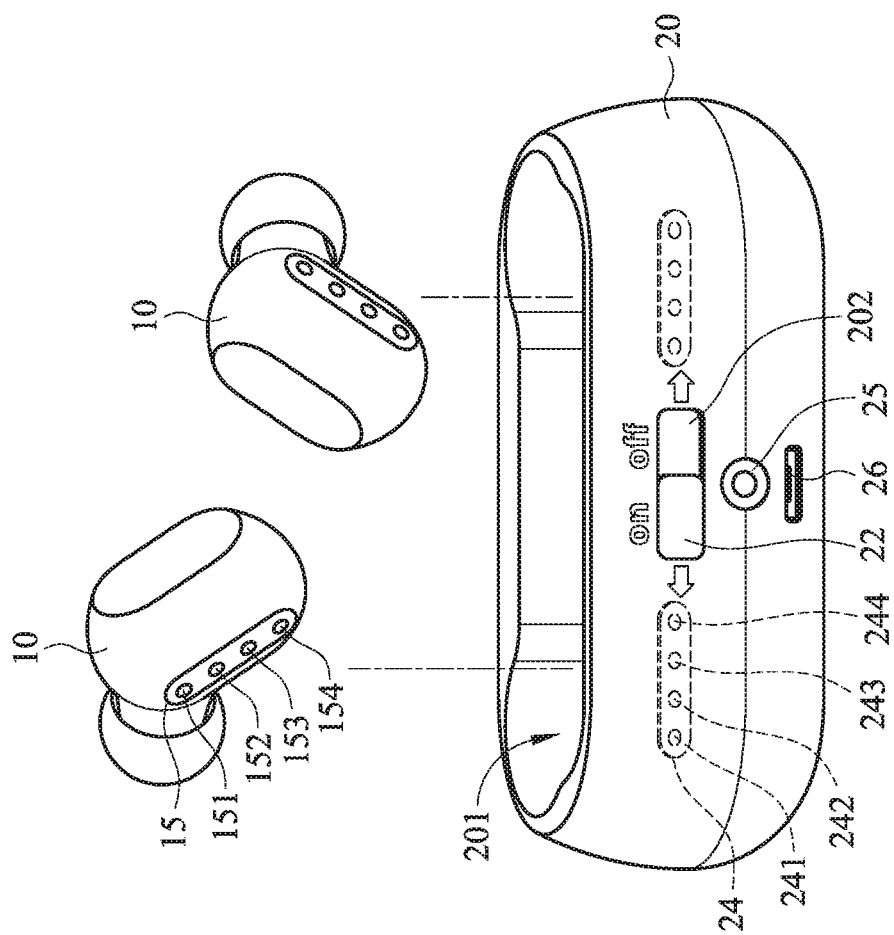
FIG. 1 is a schematic perspective view illustrating a wireless sound output device according to an embodiment of the present invention.
Figure 2:
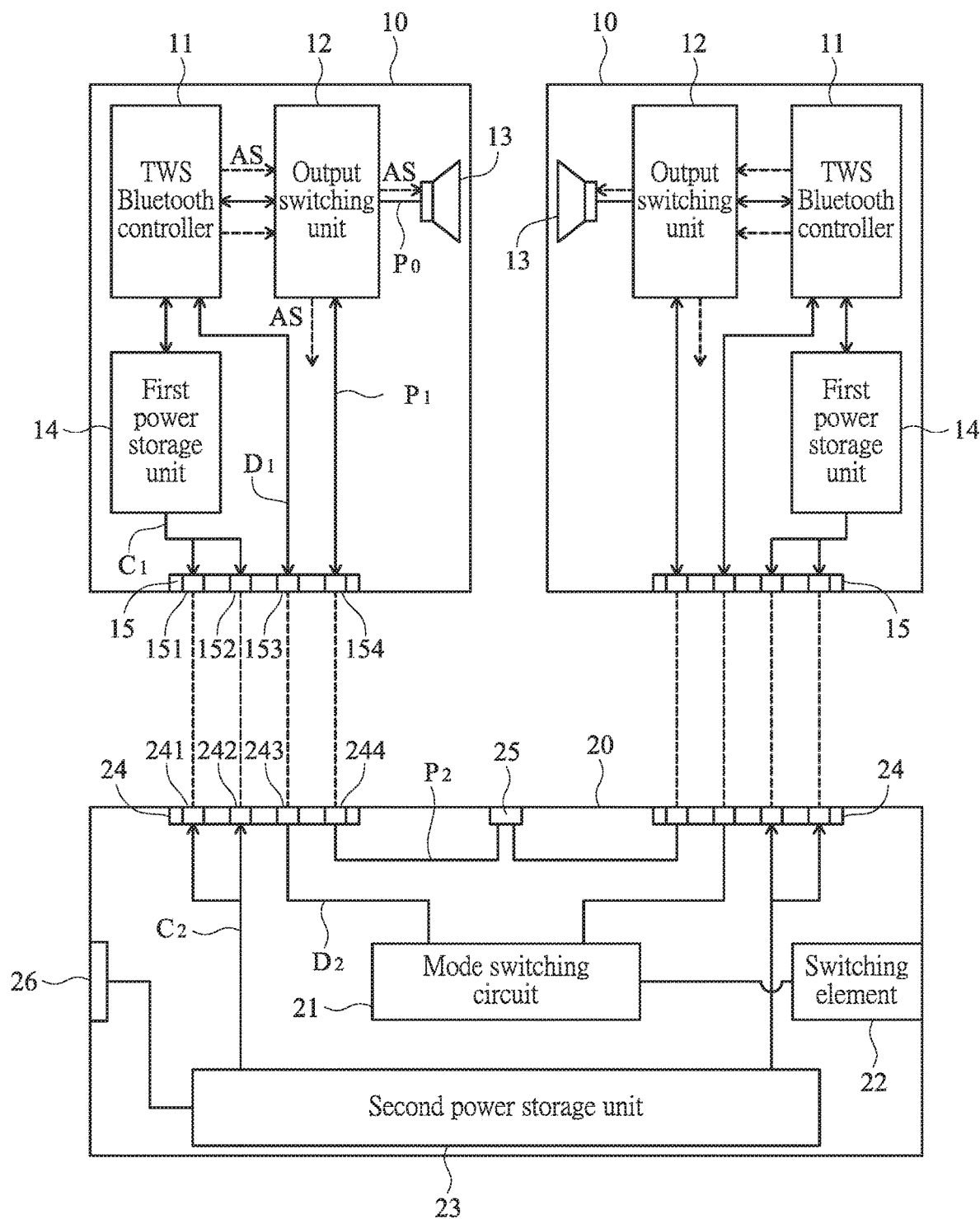
FIG. 2 is a schematic system block diagram illustrating the wireless sound output device according to the embodiment of the present invention.

Please refer to FIGS. 1 and 2. FIG. 1 is a schematic perspective view illustrating a wireless sound output device according to an embodiment of the present invention. FIG. 2 is a schematic system block diagram illustrating the wireless sound output device according to the embodiment of the present invention.

As shown in FIG. 1, the wireless sound output device 1 comprises a pair of wireless earbuds 10 and a charging base 20. An example of the charging base 20 includes but is not limited to a charging box or a charging dock. Each wireless earbud 10 comprises a first connection port 15. The first connection port 15 has plural first metal contacts 151, 152, 153 and 154. The charging base 20 comprises an accommodation structure 201 for accommodating the wireless earbuds 10. The inner portion of the accommodation structure 201 has two second connection ports 24 corresponding to the first connection ports 15. Each second connection port 24 has plural second metal contacts 241, 242, 243 and 244 corresponding to the first metal contacts 151, 152, 153 and 154. Moreover, the surface of a housing of the charging base 20 is equipped with a switching element 22, an audio source output hole 25 and a charging port 26. In this embodiment, the switching element 22 is installed in a slot 202 of the charging base 20. The top side of the slot 202 is marked with English texts (e.g., "on" and "off") in order to prompt the user of the current operation status of the switching element 22. The audio source output hole 25 and the charging port 26 are located under the switching element 22 sequentially. In some embodiments, the appearance of the charging base 20 is specially designed to have a portable type (e.g., a square portable type or a circular neck-hanging type).

As shown in FIG. 2, the wireless earbud 10 comprises a true wireless stereo (TWS) Bluetooth controller 11, an audio source analog signal output switching unit 12, a speaker unit 13, a first power storage unit 14 and the first connection port 15. The true wireless stereo Bluetooth controller 11 is electrically connected with the audio analog signal output switching unit 12 and the first power storage unit 14. The audio source analog signal output switching unit 12 is connected with the speaker unit 13 through a first audio source line $P_0$. The first power storage unit 14 is connected with the first metal contacts 151 and 152 of the first connection port 15 through a power transfer line $C_1$. The first metal contact 151 is a supply terminal (VCC). The first metal contact 152 is a ground terminal (GND). The true wireless stereo Bluetooth controller 11 is connected with the first metal contact 153 of the first connection port 15 through a detection line $D_1$. The audio source analog signal output switching unit 12 is connected with the first metal contact 154 of the first connection port 15 through a second audio source line $P_1$.

The charging base 20 comprises a mode switching circuit 21, the switching element 22, a second power storage unit 23, the second connection port 24, the audio source output hole 25 and the charging port 26. The mode switching circuit 21 is electrically connected with the switching element 22. The second power storage unit 23 is electrically connected with the charging port 26. The charging port 26 can be connected with an external power source (e.g., a utility power source or any other appropriate power bank). Consequently, the electric power from the external source can be transmitted to the second power storage unit 23 through the charging port 26 in order to charge the second power storage unit 23. The second power storage unit 23 is connected with the second metal contacts 241 and 242 of the second connection port 24 through a power transfer line $C_2$. The second metal contact 241 is a supply terminal (VCC). The second metal contact 242 is a ground terminal (GND). The mode switching circuit 21 is connected with the second metal contact 243 of the second connection port 24 through a detection line $D_2$. The audio source output hole 25 is connected with the second metal contact 244 of the audio source output hole 25 through a second audio source line $P_2$.

Please refer to FIG. 2 again. When the wireless earbud 10 is in a normal working state, the wireless earbud 10 is not disposed within the accommodation structure 201 of the charging base 20 to be charged. Meanwhile, the true wireless stereo Bluetooth controller 11 can receive a Bluetooth digital signal from a portable electronic device such as a notebook computer, a tablet computer, a personal digital assistant, a smart phone or a game console. Then, the true wireless stereo Bluetooth controller 11 converts the Bluetooth digital signal into an analog signal AS and transmits the analog signal AS to the audio analog signal output switching unit 12. Then, the analog signal AS is transmitted from the audio analog signal output switching unit 12 to the speaker unit 13 through the first audio source line $P_0$. Consequently, the analog signal AS is outputted from the speaker unit 13 in a form of sound or music.

When the wireless earbud 10 is disposed within the accommodation structure 201 of the charging base 20 to be charged (see FIG. 1), the first connection port 15 of the wireless earbud 10 is coupled with the second connection port 24 of the charging base 20. Since the first metal contacts 151, 152, 153 and 154 are respectively contacted with the second metal contacts 241, 242, 243 and 244, the charging base 20 and the wireless earbud 10 are electrically connected with each other.

If the switching element 22 is moved to the right side (i.e., the prompt status is "off"), the mode switching circuit 21 is switched to a charging mode. In the charging mode, a mode switch/GPIO circuit (not shown) of the mode switching circuit 21 issues a low level signal. The true wireless stereo Bluetooth controller 11 detects the low level signal from the mode switching circuit 21 through the detection lines $D_1$ and $D_2$. In response to the low level signal, the true wireless stereo Bluetooth controller 11 stops receiving the Bluetooth digital signal from the portable electronic device. Moreover, the second power storage unit 23 charges the first power storage unit 14 through the power transfer lines $C_1$ and $C_2$.

Whereas, if the switching element 22 is moved to the left side (i.e., the prompt status is "on"), the mode switching circuit 21 is switched to a wireless Bluetooth receiver mode. In the charging mode, the mode switch/GPIO circuit (not shown) of the mode switching circuit 21 issues a high level signal. The true wireless stereo Bluetooth controller 11 detects the high level signal from the mode switching circuit 21 through the detection lines $D_1$ and $D_2$. In response to the high level signal, the true wireless stereo Bluetooth controller 11 continuously receives the Bluetooth digital signal from the portable electronic device. At the same time, the audio analog signal output switching unit 12 switches the signal transfer path. That is, the analog signal AS is transmitted from the audio analog signal output switching unit 12 to the audio source output hole 25 through the second audio source lines $P_1$ and $P_2$. Consequently, a media signal (e.g., sound or music) is outputted from a wired speaker (not shown) that is connected with the audio source output hole 25. Moreover, the second power storage unit 23 continuously charges the first power storage unit 14 through the power transfer lines $C_1$ and $C_2$.

Figure 3A:
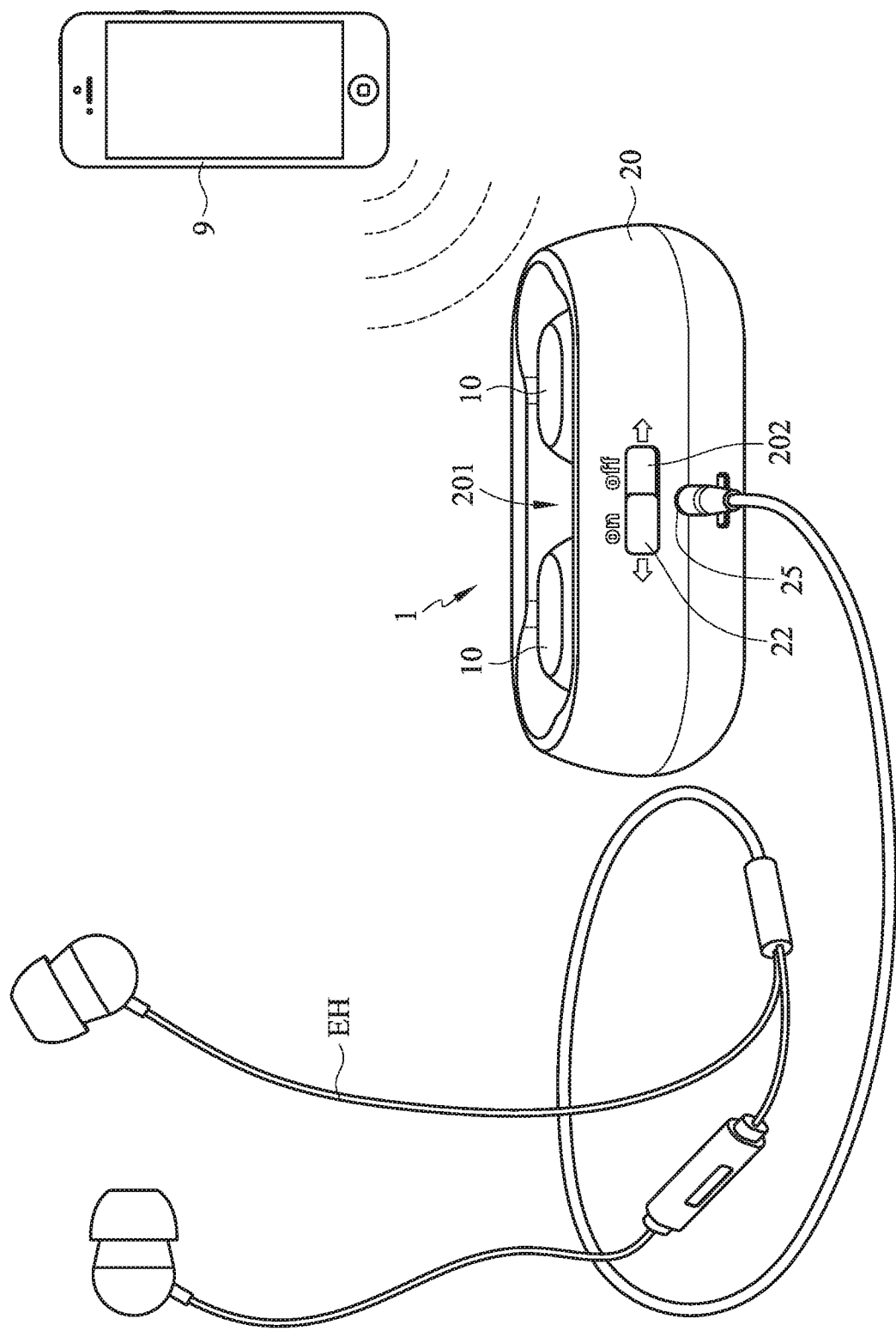
FIGS. 3A and 3B schematically illustrate two usage scenarios of the wireless sound output device according to the embodiment of the present invention.
Figure 3B:
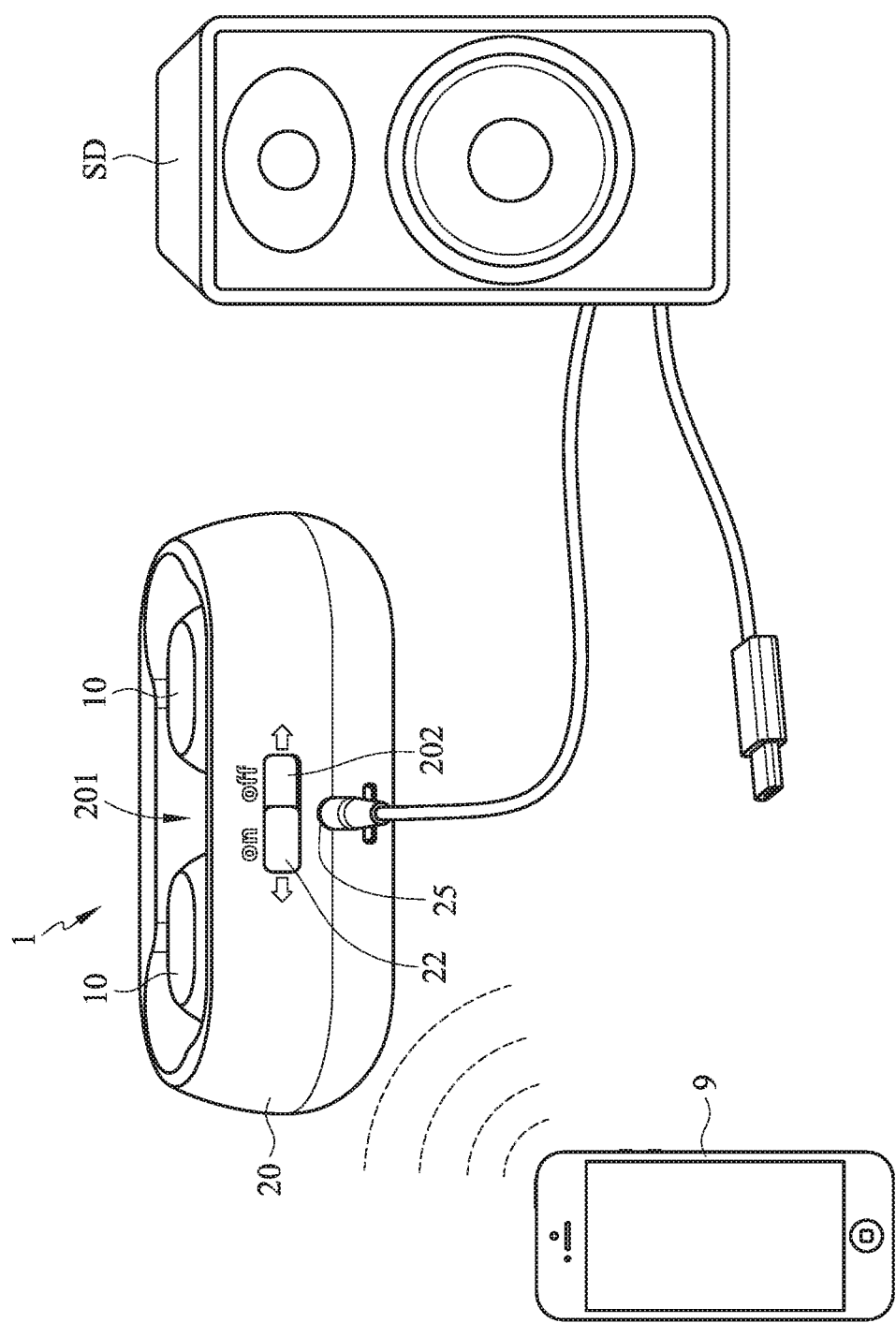

Please refer to FIGS. 3A and 3B. FIGS. 3A and 3B schematically illustrate two usage scenarios of the wireless sound output device according to the embodiment of the present invention. When the wireless earbud 10 is disposed within the accommodation structure 201 of the charging base 20 and the switching element 22 is moved to the left side (i.e., the prompt status is "on"), the wireless earbud 10 continuously receives the Bluetooth digital signal from the portable electronic device 9. For example, the portable electronic device 9 is a smart phone. After the received Bluetooth digital signal is converted into the analog signal, the analog signal is transmitted to the audio source output hole 25 of the charging base 20. As shown in FIG. 3A, an input terminal of a wired earbud EH is connected with the audio source output hole 25. As shown in FIG. 3B, an input terminal of a wired stereo device SD is connected with the audio source output hole 25. Consequently, a media signal (e.g., sound or music) can be outputted from the wired earbud EH or the wired stereo device SD according to the usage scenario.

From the above descriptions, the present invention provides the wireless sound output device. The wireless sound output device of the present invention can receive the Bluetooth digital signal while the wireless earbud is charged by the charging base. After the received Bluetooth digital signal is converted into the analog signal, the analog signal is transmitted to the charging base and outputted from a wired earbud or a wired stereo device that is connected with the charging base. Consequently, the sound or the music can be played continuously. In such way, the process of playing the sound or the music is not paused during the frequent charging process of the wireless earbud. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A wireless sound output device with a charging function, the wireless sound output device comprising:

a wireless earbud comprising a first power storage unit, a speaker unit, an audio source analog signal output switching unit, a true wireless stereo Bluetooth controller and a first connection port, wherein electric power for operating the wireless earbud is provided by the first power storage unit, wherein the true wireless stereo Bluetooth controller receives a Bluetooth digital signal from a portable electronic device, converts the Bluetooth digital signal into an analog signal, and transmits the analog signal to the speaker unit through the audio source analog signal output switching unit; and a charging base accommodating the wireless earbud, and comprising a mode switching circuit, a second connection port, a second power storage unit and an audio source output hole, wherein when the second connection port is connected with the first connection port, the charging base is electrically connected with the wireless earbud, wherein the audio source output hole is connected with a wired speaker, wherein when the true wireless stereo Bluetooth controller detects that the mode switching circuit is switched to a wireless Bluetooth receiver mode, the first power storage unit is charged by the second power storage unit and the analog signal is transmitted from the audio source analog signal output switching unit to the audio source output hole; and wherein when the true wireless stereo Bluetooth controller detects that the mode switching circuit is switched to a charging mode, the second power storage unit charges the first power storage unit and the true wireless stereo Bluetooth controller stops receiving the Bluetooth digital signal.

2. The wireless sound output device according to claim 1, wherein the charging base further comprises a switching element, wherein the mode switching circuit is switched to the wireless Bluetooth receiver mode or the charging mode through an operation of the switching element.

3. The wireless sound output device according to claim 1, wherein the charging base further comprises a charging port, and the charging port is connected with an external power source, wherein electric power from the external power source is transmitted to the second power storage unit through the charging port so as to charge the second power storage unit.

4. The wireless sound output device according to claim 1, wherein the wired speaker is a wired earbud or a wired stereo device.

5. The wireless sound output device according to claim 1, wherein the portable electronic device is a notebook computer, a tablet computer, a personal digital assistant, a smart phone or a game console.

6. The wireless sound output device according to claim 1, wherein the charging base comprises an accommodation structure, and the wireless earbud is accommodated within the accommodation structure.

7. The wireless sound output device according to claim 6, wherein the second connection port is installed in the accommodation structure.

* * * * *